(12) United States Patent
Kaminski

(10) Patent No.: US 6,189,423 B1
(45) Date of Patent: Feb. 20, 2001

(54) TORQUE-TOOL GRIP, TORQUE TOOL AND METHOD

(75) Inventor: Mitchell V. Kaminski, Chicago, IL (US)

(73) Assignee: Nina Grahma & Michell V. Kaminski, McKinney, TX (US)

( * ) Notice: Under 35 U.S.C. 154(b), the term of this patent shall be extended for 0 days.

(21) Appl. No.: 09/327,290

(22) Filed: Jun. 7, 1999

(51) Int. Cl.[7] .................................................. B25G 1/01
(52) U.S. Cl. .......................................... 81/489; 81/177.1
(58) Field of Search .................................. 81/177.1, 489, 81/177.6, 177.3, 487, 492; 16/DIG. 12, DIG. 18, DIG. 41, 110 R, 118; 7/167

(56) References Cited

U.S. PATENT DOCUMENTS

| | | |
|---|---|---|
| D. 154,326 | 6/1949 | Roysher . |
| D. 256,882 | 9/1980 | Jansson . |
| D. 328,700 | 8/1992 | Steiger . |
| 3,438,413 * | 4/1969 | Borah ........................ 145/50 |
| 3,592,247 * | 7/1971 | Solf ........................... 145/61 |
| 4,739,536 * | 4/1988 | Bandera et al. ............ 16/111 R |
| 4,768,409 | 9/1988 | Fitzwater . |
| 4,922,575 * | 5/1990 | Riemann ..................... 16/111 R |
| 4,969,231 | 11/1990 | Mader et al. . |
| 5,390,572 | 2/1995 | Gakhar et al. . |
| 5,556,092 * | 9/1996 | Theken ...................... 273/75 |
| 5,722,116 | 3/1998 | Lin . |

* cited by examiner

Primary Examiner—Timothy V. Eley
Assistant Examiner—Dung Van Nguyen
(74) Attorney, Agent, or Firm—Joan I. Norek; Law Office of Joan I. Norek

(57) ABSTRACT

A handgrip for a torque tool, such as a screwdriver, provides enhanced tool torque capabilities and improved driving capabilities. The handgrip has a top or free-end segment available for low-torque twirling action using the fingertips, and a bottom or working-end segment that together with the top segment is grasped in one's hand for high torque application. The handgrip has the configuration approaching that of a three-sided bell that provides finger holds, bearing surfaces, and outlying lobes which alone or in combination improve torque capabilities and/or driving capabilities for the effort applied.

15 Claims, 3 Drawing Sheets

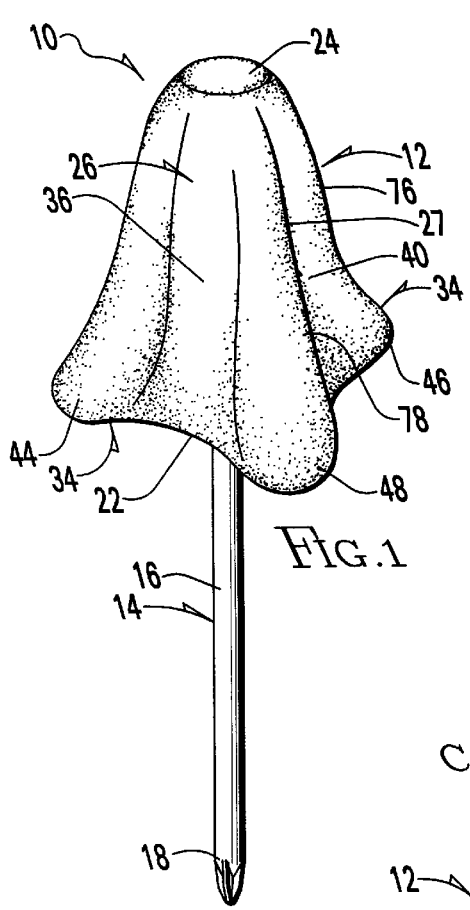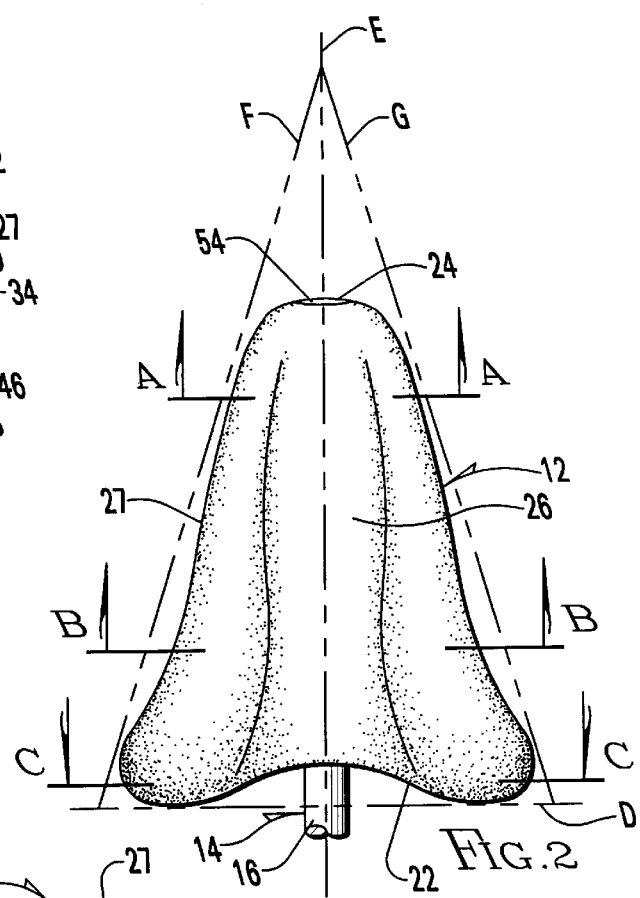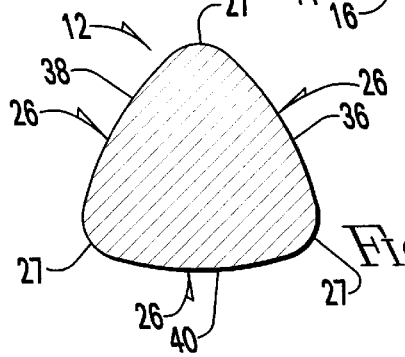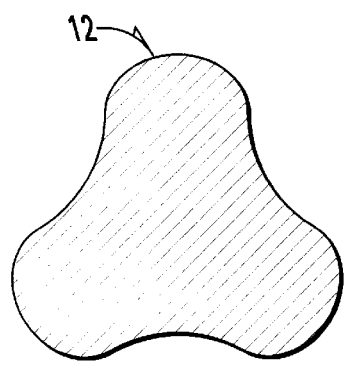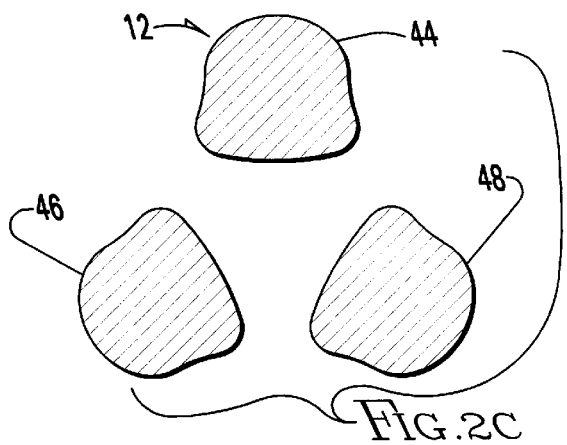

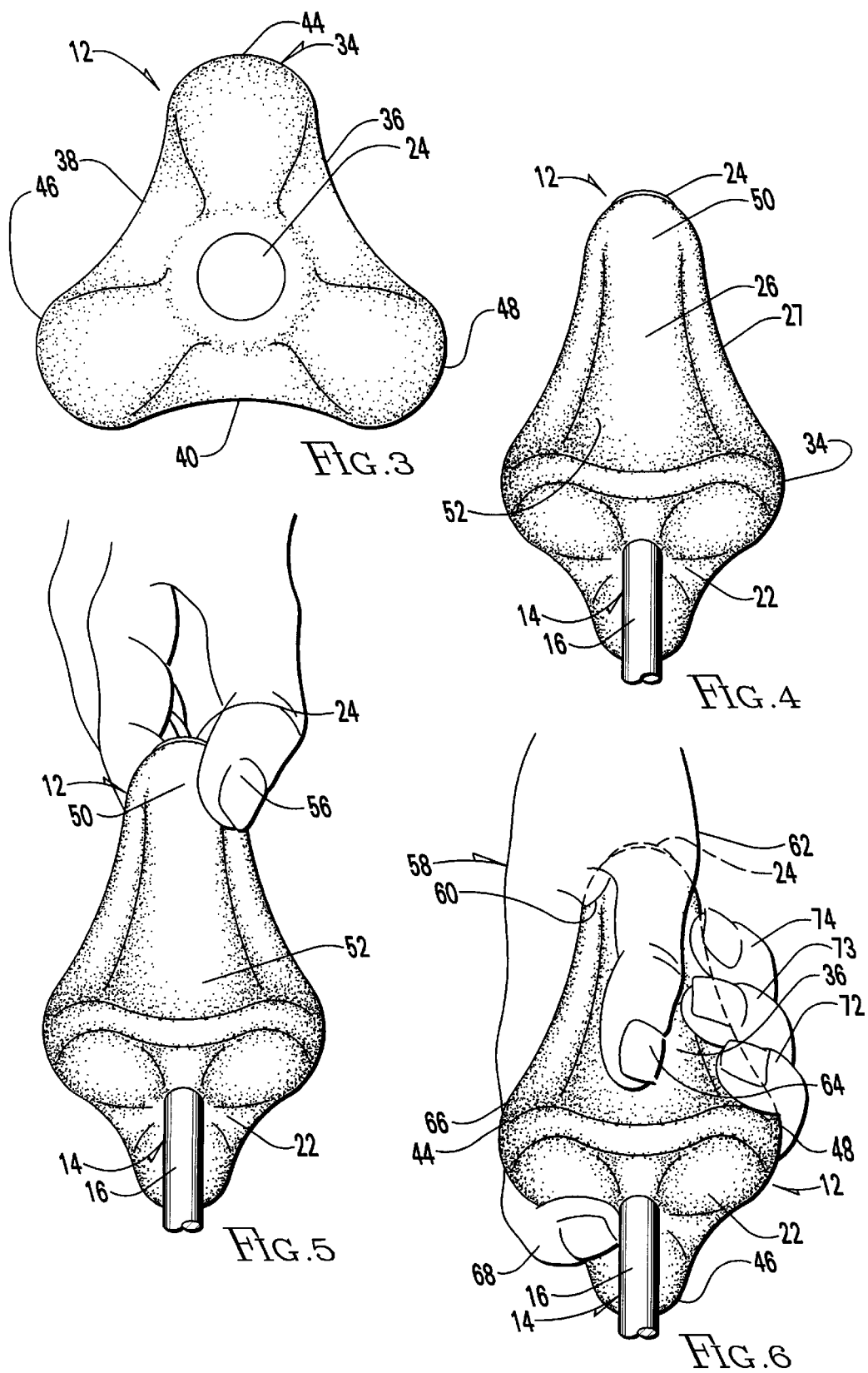

TORQUE-TOOL GRIP, TORQUE TOOL AND METHOD

BACKGROUND OF THE INVENTION

Tools such as screwdrivers and nut drivers are implemented by hand rotation about an axis. This rotation axis is normally the longitudinal axis of the tool. The tool normally has a handle (or handgrip) end and a working (or tool) end. The working member often includes a shaft or shank bridging the handle and a tool element, the handle being connected or joined to such shaft or shank. The handle is rotated or torqued to transfer the applied torquing forces to the shank and tool element. Improved torque capabilities or efficiencies is desirable to increase the torquing forces transferred to shank and tool element for a given handle rotation effort or exertion.

It is also desirable to readily spin a screwdriver and the like about the rotation axis when only a low degree of torque is required for a task. Improved downward pressure (or driving) capabilities is also desirable.

BRIEF SUMMARY OF THE INVENTION

The present invention is a handgrip for a torque tool, such as a screwdriver, that provides enhanced tool torque capabilities and improved driving capabilities. The handgrip has a top or free-end segment available for low-torque twirling action using the fingertips, and a bottom or working-end segment that together with the top segment is grasped in one's hand for high torque application. The handgrip has a configuration approaching that of a three-sided bell that provides finger holds, bearing surfaces, and outlying lobes which alone or in combination improve torque capabilities and/or driving capabilities for the effort applied. The invention is also a torque tool that includes such a handgrip and has enhanced tool torque capabilities and improved driving capabilities. The present invention is also method of using such a torque tool whereby enhanced tool torque capabilities and improved driving capabilities are realized.

BRIEF DESCRIPTION OF THE SEVERAL VIEWS OF THE DRAWING

FIG. 1 is a perspective view of a screwdriver and a handgrip of the invention;

FIG. 2 is a partially cutaway side view of the screwdriver of FIG. 1;

FIG. 2a is a cross-sectional view of the screwdriver of FIG. 1, taken along plane A of FIG. 2;

FIG. 2b is a cross-sectional view of the screwdriver of FIG. 1, taken along plane B of FIG. 2;

FIG. 2c is a cross-sectional view of the screwdriver of FIG. 1, taken along plane C of FIG. 2;

FIG. 3 is a top view of the screwdriver of FIG. 1;

FIG. 4 is a perspective view of the bottom of the hand grip of the screwdriver of FIG. 1;

FIG. 5 is a perspective view of the screwdriver of FIG. 1 being gripped by the fingertips of a hand;

FIG. 6 is a perspective view of the screwdriver of FIG. 1 being gripped by a hand;

DETAILED DESCRIPTION OF THE INVENTION

Figure 7:
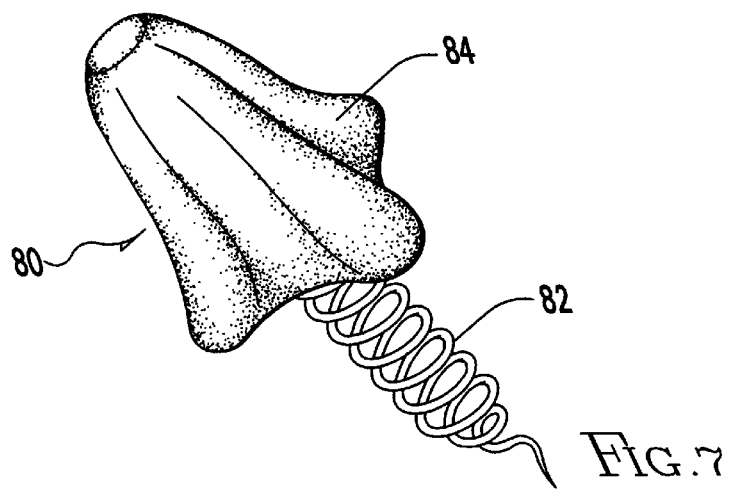
FIG. 7 is a perspective view of a soil aerator with a handgrip of the invention.

There is seen in FIG. 1 through FIG. 4 a hand tool, namely a screwdriver 10 comprised of a handgrip 12 and a working member 14. The working member 14 is comprised of a shank element or shank 16 and a tool element 18. The tool of the present invention can be any torque implement, utensil or tool. The most commonly known torque tool is probably, as exemplified, a screwdriver. Among other torque tools are, without limitation, nut drivers, augers, other tools that are rotated to produce or deepen holes, such as some awls and soil aerators, tools that are rotated to sweep or cut via a wing or shaft protuberances, such as some weeders and cultivators, and tools that are rotated to turn or revolve and downwardly drive a coil spiral, such as some soil cultivators and most cork screws. Torque tools are implemented by rotation about an axis. This rotation axis is normally, but not necessarily, the longitudinal axis of the tool. The tool normally has a handle end and a working end. The working end is comprised of a working member, which at times is comprised of a shaft or shank element and a tool element. The handle or handgrip is commonly attached to the working member at the shaft or shank, opposite the working element, or via another type of interconnection element. The handgrip is rotated or torqued to transfer the applied torquing forces to the working member.

The screwdriver 10 as shown is a simple slot screwdriver having a slot screwdriver tool element or tip 18. The screwdriver 10 exemplified obviously could also have been a phillips tip (for driving phillips head screws), or a socket driver tip or the like, each having a shank plus a characteristic tool element.

The tip 18 and the shank 16 as shown in FIG. 1 are formed in conventional fashion as a single, unitary piece of metal or other strong material, such as reinforced composites. The tip 18 is located at the far end, or distal end, of the shank 16. The shank 16 is attached to the handgrip 12 at the shank's 16 opposite or proximal end in conventional fashion, such as being received, and keyed to or otherwise suitably secured in, an axial bore (not shown). The shank 16 and the internal interconnection between shank 16 and handgrip 12 (not shown) must be sufficiently strong and rigid to resist substantial torque without distortion or separation. Such a strong and rigid shank 16 and interconnection between shank 16 and handgrip 12 are conventional and well known in the hand tool field. The tip 18 (tool element) and the shank 16 in this embodiment comprise together the working member 14 of the screwdriver 10.

The handgrip 12 is shaped in the form of a deformed snub-nosed cone. Its base 22 presents an end-view or bottom-view tri-lobed profile. From the base 22 the handgrip 12 tapers up to a stubby, rounded apex 24. The apex 24 is the handgrip's free end or proximal end. The base 22 is the handgrip's working end or distal end that receives the working member 14 of this tool.

The handgrip 12 has three lateral or side surfaces or faces or handgrip sides 26 meeting at rounded longitudinal edges or corners 27. Each side face 26 has a bell-shaped or webbed-footed triangular planar side-view profile. The webbed-footed portion of such profile is formed by a pair of lobes or protuberances 34 described below. Above the webbed-footed portion such profile runs upward in substantially a straight line to the rounded apex 24.

In the upper portion of the handgrip 12 (upper, top, lower, bottom and like references being taken as if the screwdriver 10 was oriented with the working member 14 pointed downward solely for convenience and clarity purposes), each of the handgrip's side surfaces 26 is substantially flat, except about its rounded longitudinal edges 27. That is, the handgrip's three faces 26 are substantially flat from the handgrip's apex 24 down to about the handgrip's longitudinal mid-point. Below the handgrip's longitudinal mid-point, these three faces 26 are concave. The bottom or base 22 surface is also concave.

The handgrip 12 thus is comprised of three moderately-triangulate, and partially-concave faces 26, (a first face 36, a second face 38 and a third face 40), and a concave tri-lobed base 22. Each of the faces 26 meets the other faces 26 and the base 22 at the rounded corners 27. The three faces 26 converge at the rounded apex 24 or vertex. Each of the lobes 34 is disposed at a juncture of two faces 26 and the base 22. In more detail, the first lobe 44 is at the point where the first face 36, the second face 38 and the base 22 converge. The second lobe 46 is at the point where the second face 38, the third face 40 and the base 22 converge. The third lobe 48 is at the point where the third face 40, the first face 36 and the base 22 converge.

The handgrip's top segment 50 has a substantially triangular cross-sectional profile or shape (seen best in FIG. 2a), the size of such triangulate profile growing progressively larger from the top apex 24 downward to about the handgrip's mid-section. The handgrip's bottom segment 52 has a substantially palmate (tri-lobate) cross-sectional profile or shape (seen best in FIG. 2b) from about the handgrip's longitudinal mid-section down to about the bottom edges of the faces 26 at their longitudinal center lines (shown in phantom by line E in FIG. 2). The size of such tri-lobate palmate cross-section profile grows progressively larger from about the handgrip's longitudinal mid-section downward until the handgrip's axial center ends at the center or bottom of the concave base 22, leaving the three spaced apart lobes 34. Therefore, below the cross-sectional plane in which the center or bottom of the concave base 22 lies (shown in phantom as line C of FIG. 2) (which in the embodiment shown would pass through at each of the bottom edges of the faces 26 at their longitudinal center lines), the cross-sectional profile of the handgrip 12 is a lobed whorl (seen best in FIG. 2c).

The faces 26 and base 22 are the outer or external surfaces of the handgrip 12. The handgrip's apex 24 can be formed or molded as a continuation and convergence of the faces 26 or, as shown, can be an end cap 54.

Referring now to FIG. 5 also, the top or proximal end of the handgrip 12 provides a flared knob or knob section that can be easily gripped or held by the user's fingertips 56, and the screwdriver 10 twirled or spun by fingertip motion. In this fashion the screwdriver 10 can be twirled for low torque tasks substantially as if it were equipped with a conventional tubular (circular cross-sectional profile) handle. There are no obstructions or impediments hampering fingertip twirling of the screwdriver 10. Moreover, a handgrip or handle having an upper portion with a circular cross-sectional profile is not excluded from the broad embodiments of present invention. In the preferred embodiment shown, there is an enhancement of the torque and driving capabilities even when fingertip action is the only effort applied. Any fingertips 56 placed on about the center of any of the faces 26 will at least somewhat bear against the ridge separating the center portions of adjacent faces 26, making the applied twirling effort more efficient than it would be on a handle having an effective circular cross-sectional profile. In addition, the outwardly sloping surfaces of the top of the handle will increase the downward driving force of the screwdriver 10, making the downward pressure more efficient than it would be on a handle having an effective circular cross-sectional profile. Even during low-torque, twirling uses of a screwdriver, some downward pressure is applied at least to hold the tip against the screw being driven. In the preferred embodiment shown, the handgrip's top segment 50 has outwardly sloping surfaces at every point along its circumference.

Referring now to FIG. 6 also, there is a greater enhancement of the torque and driving capabilities when a full hand action is the effort applied for high torque application. When the handgrip 12 is grasped in a hand 58, the handgrip's top segment 50 fits smoothly into the palm 60 and the stubby apex 24 bears against the bottom 62 of the palm 60. The first face 36 provides a comfortable bearing surface for the side of the hand 58 below the thumb 64 and comfortable groove or depression or seat for the thumb 64 within its concave surface area. The ridge or corner 66 at the convergence of the first face 36 and a second face 38 fits snugly between the thumb 64 and first finger 68. The top 70 of the first finger 68 is held against the base 22 between the shank 16 and the second lobe 46. The first finger 68 thus bears against the base 22, firming the hand's grip on the handgrip 12. The middle finger 72 and the remaining fingers 73, 74 clamp over the ridge 76 between the second face 38 and the third face 40, that ridge 76 fitting snugly into the fold of those fingers 72, 73, 74 at their lower joints. The top of the middle finger 72 is seated with the concave groove or depression or seat of the third face 40 at the handgrip's bottom segment 52. The tops of the remaining fingers comfortably fit around and bear against the handgrip's top segment 50 about the ridge 78 between the third face 40 and the first face 38. When the rotational motion is initiated, the thumb 64 will slide at least somewhat towards the first lobe 44, and torque will be increased as one of the pressure-points of rotational force approaches the tip of a lobe 34. There are no obstacles or impediments during the normal shifting of the hand position after a screwdriver 10 has turned through an typical arc (an arc of about 30° to about 50° is believed conventional). In fact, the typical user would use the first lobe 44 as a type of springboard for the hand-shift movement, pushing off the first lobe 44 with the thumb 64 as the hand shifts in the direction opposite the screwdriver 10 rotation direction. After the first hand shift, the thumb 64 bears against the third face 40, the top of the first finger 68 is seated between the shank 16 and the first lobe 44, and so forth.

When using the screwdriver 10 with a full hand grasp, the hand 58 and fingers 64, 68, 72, 73, 74 not only contact the outwardly sloping surfaces of the handgrip's top segment 50 at many points, from about 40% to about 70% of the inner hand and finger surfaces bear against from about 80% to about 90% of the handgrip's side surfaces. This immense bearing contact will considerably increase the downward driving force of the screwdriver 10, making the downward pressure more efficient than it would be on a handle having an effective circular cross-sectional profile.

The hand grasping illustration and description provided above is for a right-hand grasp followed by a clockwise turn (as viewed from the perspective of the user). Clockwise is the normal rotation direction for driving in a screw, and is the most comfortable rotation direction for a right-handed person. When a screwdriver is used in the right hand, but with a counter-clockwise rotation, or when used with the left hand for a clockwise rotation, the benefits of the present invention would be similarly obtained.

The handgrip 12 as shown has a lobe-tip to lobe-tip span of about three inches. The handgrip 12 is about 4.2 or 4.3 inches high when measured from the plane defined by the three lobe 34 bottoms (shown as line D in FIG. 2) to the top of the apex 24, and about four inches high when measured from the plane defined by the bottom center edges of the three faces 26 (shown as line C in FIG. 2) to the top of the apex 24. Its profile would fit within an equilateral triangle having about a three inch base and sides about six inches long (shown as lines F and G and interconnecting section of line D in FIG. 2) with the bottoms of its lobe 34 on the base line and the sides of the handgrip's top segment 50 on the side lines. This size of handgrip approaches the largest size practical for the typical human hand. Smaller sizes would be proportionally smaller. The present invention in broad embodiment is not limited to specific dimensions. In preferred embodiment, the handgrip of the present invention: (a) has a lobe-tip to lobe-tip span of from about two to about four inches; (b) is from about three to about five inches high when measured either from the plane defined by the lobe bottoms, or from the plane defined by the bottom center edges of its three faces, to the top of its apex, and (c) its profile would fit within an equilateral triangle having about a two to four inch base and sides about five to seven inches long. In more preferred embodiment, the handgrip of the present invention: (a) has a lobe-tip to lobe-tip span of from about 2.5 or 2.7 to about 3.3 or 3.5 inches; (b) is from about 3.8 or 4.0 to about 4.5 or 4.7 inches high when measured from the plane defined by the lobe bottoms to the top of its apex, (c) is from about 3.6 or 3.8 to about 4.2 or 4.5 inches high when measured from the plane defined by the bottom center edges of its three faces to the top of its apex, and (d) its profile would fit within an equilateral triangle having from about a 2.5 or 2.7 to about a 3.2 or 3.5 inch base and sides from about 5.5 or 5.7 to about 6.2 or 6.5 inches long.

Referring now to FIG. 7, there is shown a different torque tool, namely a soil aerator 80 having a working member, namely a sharp-pointed long, rigid spiral coil 82, and handgrip 84. The spiral coil 82 penetrates deeper and deeper into the soil with the rotation of the aerator using the handgrip 84. The features and operation of the handgrip 84 are substantially as described above for the screwdriver 10, and will not be repeated here. In this embodiment, the spiral coil 82 is a combined tool element and working element.

Figure 8:
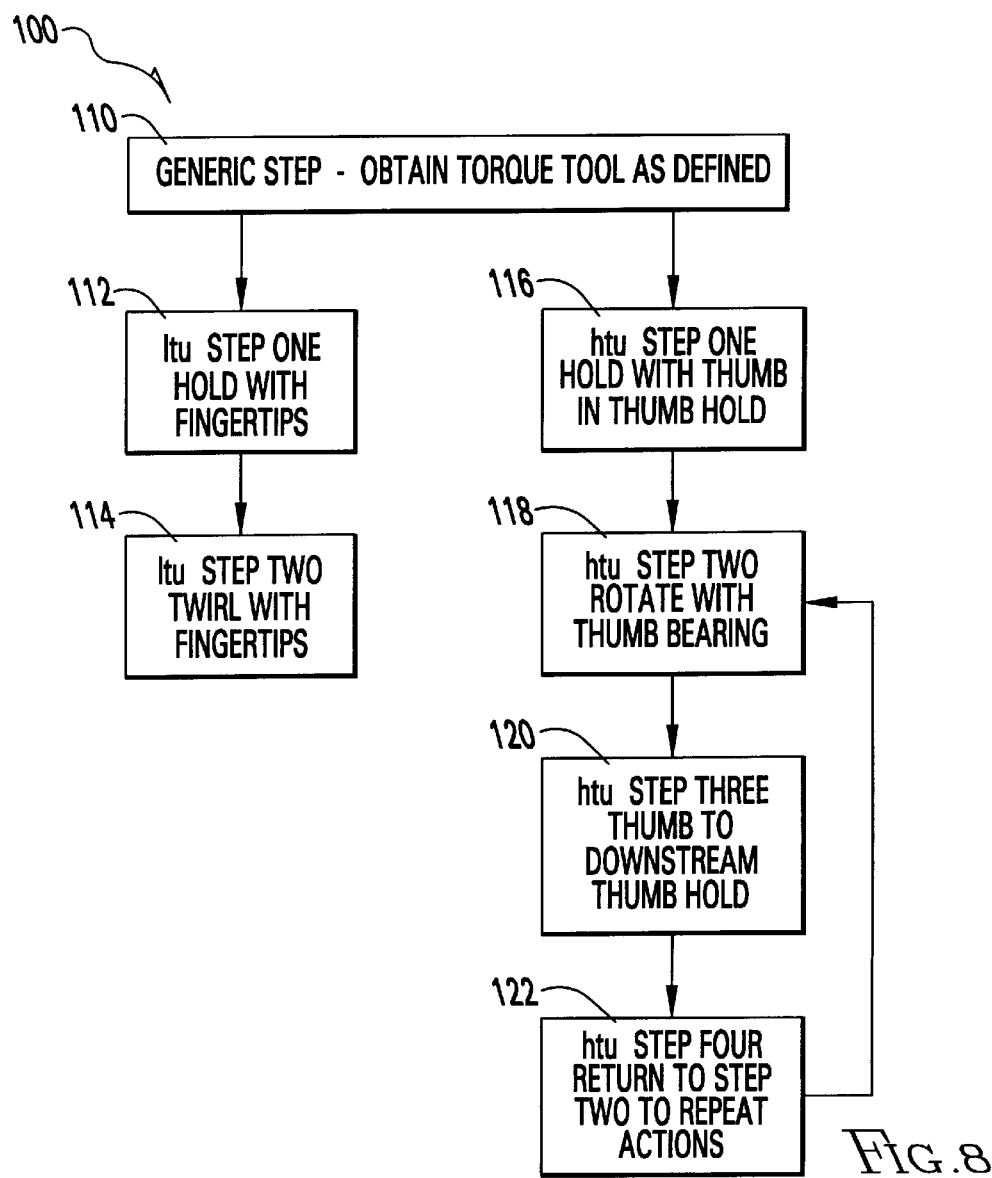
FIG. 8 is a flow-diagram of the method of the present invention.

Referring now to FIG. 8 there is shown a flow diagram, designated generally by reference number 100, of the method of using a hand-held torque instrument of the present invention. The torque instrument being used (not shown) is within the present invention. The torque tool has a working member and a handgrip. The handgrip has a proximal end, a distal end and a rotational axis. The proximal end of the handgrip provides a flared knob member. The distal end of the handgrip has a plurality of longitudinally-extending thumb holds separated by bearing means extending outwardly from the rotational axis beyond the thumb holds. As shown in FIG. 8, the method has two separate lines of steps. On the left side are low-torque-use steps. On the right side are high-torque-use steps. The generic step 110 common to both low-torque and high-torque use of the tool (and normally presumed) is to obtain the torque tool as defined. For low-torque use ("ltu"), step one 112 is to hold the handgrip at the flared knob member by a plurality of fingertips. Step two 114 is to twirl the torque instrument about its rotational axis with a twirling action of the fingertips. For high-torque use ("htu"), step one 116 is to hold the handgrip with one hand, the thumb of the hand disposed within one of the thumb holds. Step two 118 is to rotate the torque instrument about its rotational axis with a turning action of the hand, the thumb bearing against adjacent upstream bearing means. Step three 120 is to move the thumb over the downstream bearing means to the downstream thumb hold. Step four 122 is to return to step two 118 to repeat the action from step two 118 downward.

The present invention in other words is a torque tool comprising a handgrip having a working-end tri-lobed base tapering up to a free-end stubby apex and a working member attached to the handgrip at the handgrip's working-end. The handgrip preferably has three lateral faces meeting each other at longitudinal corners and converging at the apex. The handgrip preferably has an upper section and a lower section, wherein in the upper section the handgrip's faces have substantially flat mid-sections, and wherein in the lower section the handgrip's faces have substantially concave mid-sections. The base preferably has a substantially concave midsection. Each of the faces preferably meets the other faces and meets the base at rounded corners, and each of the lobes preferably is disposed at a juncture of two faces and the base. The handgrip's three faces preferably are substantially flat from the apex down to about the handgrip's longitudinal mid-point. Below the handgrip's longitudinal mid-point, these the faces preferably are substantially concave.

The present invention also is the handle for the torque instrument. The handle in other words can be described as having a first face, a second face and a third face, converging at an apex, each of the faces preferably being moderately-triangulate, and partially-concave. The handle preferably has a base having a first lobe, a second lobe, and a third lobe. The first lobe is disposed at the convergence juncture of the first face, the second face and the base. The second lobe is disposed at the convergence juncture of the second face, the third face and the base. The third lobe is disposed at the convergence juncture of the third face, the first face and the base. The handle preferably is comprised of a top segment and a bottom segment. The top segment has a substantially triangular cross-sectional profile, the size of the triangulate profile progressively increasing from the apex downward. The bottom section has a substantially tri-lobate palmate cross-sectional profile, the size of such tri-lobate palmate cross-section profile progressively increasing downward to the base. The handle's cross-sectional profile at the base is a lobed whorl.

The present invention is also a method of using a hand-held torque instrument, wherein the torque instrument has a working member and a handgrip, the handgrip having a proximal end, a distal end and a rotational axis, the proximal end of the handgrip providing a flared knob member, and a distal end of the handgrip having a plurality of longitudinally-extending thumb holds separated by bearing means extending outwardly from the rotational axis beyond the thumb holds. The method comprises the steps of:

(A) for low-torque use, holding the handgrip at the flared knob member by a plurality of fingertips and twirling the torque instrument about its rotational axis with a twirling action of the fingertips, and (B) for high-torque use,
  (a) holding the handgrip with one hand, the thumb of the hand disposed within one of the thumb holds,
  (b) rotating the torque instrument about its rotational axis with a turning action of the hand, the thumb bearing against adjacent upstream bearing means,
  (c) then moving the thumb over the downstream bearing means to the downstream thumb hold, and
  (d) returning to step (b) to repeat the action sequence.

When the bearing means of the handgrip are each comprised of a ridge and a lobe, and when the handgrip further includes a base surface disposed between the lobes, the method preferably includes positioning the first finger of the hand at least partially on the base surface between the working member and one of the lobes when the thumb is in one of the thumb holds. When the handgrip has three lobes, namely a first lobe, a second lobe, and a third lobe equidistant from the handgrip's rotational axis and equidistant from each other, and when the base surface is concave, the method preferably further includes holding the flared knob member between the palm of the hand and the fourth and fifth fingers of the hand, and pressing the handgrip into the palm with the first finger. The method also preferably includes pressing the torque tool downward by the force of the palm and the fourth and fifth fingers on the flared knob member.

It is well within the skill of a person in the technical field, upon becoming conversant with, or otherwise having knowledge of, the present invention, to select suitable combinations of handgrip components, tool working members, tool elements, method lines and/or steps and the like in view of the type of handgrip and/or tool being designed and/or constructed and/or used.

The above described embodiments are exemplitive, and the terminology is employed for illustration purposes and not limitation purposes. The present invention is not limited to the combinations and subcombinations illustrated herein.

I claim:

1. A torque tool comprising:
   a handgrip having a working-end tri-lobed base tapering up to a free-end stubby apex;
   a working member attached to said handgrip at said handgrip's working-end;
   wherein said handgrip has three lateral faces, each of said faces being flanked by said other two faces and separately meeting each of said other two faces at longitudinal corners and said three lateral faces converging at said apex, and each of said faces having a webbed-footed triangular side-view profile.

2. The torque tool of claim 1 wherein said three faces are substantially flat from said apex down to about said handgrip's longitudinal midpoint, and below said handgrip's longitudinal midpoint, said faces are substantially concave.

3. The torque tool of claim 1 wherein said working member is comprised of a shank and a screwdriver tip.

4. A handle for a torque implement comprising:
   a first face, a second face and a third face, converging at an apex, each of said faces being moderately-triangulate, and partially-concave, and each of said faces having a webbed-footed triangular side-view profile;
   a base having a first lobe, a second lobe, and a third lobe,
   said first lobe being disposed at the convergence juncture of said first face, said second face and said base,
   said second lobe being disposed at the convergence juncture of said second face, said third face and said base, and
   said third lobe being disposed at the convergence juncture of said third face, said first face and said base.

5. The handle of claim 4 wherein said handle is comprised of a top segment and a bottom segment,
   said top segment has a substantially triangular cross-sectional profile, the size of said triangulate profile progressively increasing from said apex downward,
   said bottom section has a substantially tri-lobate palmate cross-sectional profile, the size of such tri-lobate palmate cross-section profile progressively increasing downward to said base.

6. The handle of claim 4 wherein said handle's cross-sectional profile at said base is a lobed whorl.

7. A torque tool comprising:
   a handgrip having a working-end tri-lobed base tapering up to a free-end stubby apex; and
   a working member attached to said handgrip at said handgrip's working-end,
   wherein said base has a substantially concave midsection.

8. The torque tool of claim 7 wherein said handgrip has three lateral faces meeting each other at longitudinal corners and converging at said apex.

9. The torque tool of claim 7 wherein said handgrip has three lateral faces, each of said faces being flanked by said other two faces and separately meeting each of said other two faces at longitudinal corners and said three lateral faces converging at said apex.

10. The torque tool of claim 7 wherein said handgrip has three lateral faces, each of said faces being flanked by said other two faces and separately meeting each of said other two faces at longitudinal corners and said three lateral faces converging at said apex,
    wherein said faces each has an upper section and a lower section,
    wherein in said upper sections of said faces have substantially flat mid-sections, and
    wherein in said lower sections of said faces have substantially concave mid-sections.

11. The torque tool of claim 7 wherein said handgrip has three rounded corners, wherein said handgrip has three lateral faces converging at said apex, and
    wherein each of said faces is flanked by said other two faces and separately meets each of said other two faces and meets said base at said rounded corners, and each of said lobes is disposed at a juncture of two faces and said base.

12. The torque tool of claim 7 wherein said handgrip has three lateral faces, each of said faces being flanked by said other two faces and separately meeting each of said other two faces at longitudinal corners and said three lateral faces converging at said apex, and
    wherein said three faces are substantially flat from said apex down to about said handgrip's longitudinal midpoint, and below said handgrip's longitudinal midpoint, said faces are substantially concave.

13. The torque tool of claim 7 wherein said working member is comprised of a shank and a screwdriver tip.

14. A torque tool comprising:
    a handgrip having a working-end tri-lobed base tapering up to a free-end stubby apex; and
    a working member attached to said handgrip at said handgrip's working-end
    wherein said handgrip has three lateral faces, each of said faces being flanked by said other two faces and separately meeting each of said other two faces at longitudinal corners and said three lateral faces converging at said apex,
    wherein said faces each has an upper section and a lower section,
    wherein in said upper sections of said handgrip's faces have substantially flat mid-sections, and
    wherein in said lower sections of said handgrip's faces have substantially concave mid-sections.

15. A torque tool comprising:
    a handgrip having a working-end tri-lobed base tapering up to a free-end stubby apex; and
    a working member attached to said handgrip at said handgrip's working-end, wherein said handgrip has three rounded corners, wherein said handgrip has three lateral faces converging at said apex, and wherein each of said faces is flanked by said other two faces and separately meets each of said other two faces and meets said base at said rounded corners, and each of said faces has a webbed-footed triangular side-view profile, and each of said lobes is disposed at a juncture of two faces and said base.

* * * * *